United States Patent [19]

Heijman

[11] Patent Number: 5,370,410
[45] Date of Patent: Dec. 6, 1994

[54] ONE-WHEELED VEHICLE

[76] Inventor: Marinus Heijman, Albast 13, NL-3831 VX Leusden, Netherlands

[21] Appl. No.: 30,407
[22] PCT Filed: Oct. 18, 1991
[86] PCT No.: PCT/NL91/00207
   § 371 Date: Apr. 1, 1993
   § 102(e) Date: Apr. 1, 1993
[87] PCT Pub. No.: WO92/06885
   PCT Pub. Date: Apr. 30, 1992

[30] Foreign Application Priority Data

Oct. 19, 1990 [NL] Netherlands .................. 9002289

[51] Int. Cl.⁵ .................................................. B62K 1/00
[52] U.S. Cl. ........................................ 280/206; 180/10
[58] Field of Search ............... 280/205, 206, 207, 78; 180/10

[56] References Cited

U.S. PATENT DOCUMENTS

| | | | |
|---|---|---|---|
| 2,107,766 | 2/1938 | Rose | 180/10 |
| 3,260,324 | 7/1966 | Suarez | 280/206 |
| 3,777,835 | 12/1973 | Bourne | 180/10 |
| 4,386,787 | 6/1983 | Maplethorpe et al. | 280/206 |
| 4,401,314 | 8/1983 | Zimmerman | 280/206 |
| 5,064,210 | 11/1991 | Gibbons | 280/206 |

FOREIGN PATENT DOCUMENTS

| | | | |
|---|---|---|---|
| 648547 | 12/1928 | France | |
| 2108492 | 9/1972 | Germany | |
| 440004 | 12/1967 | Switzerland | 280/206 |

Primary Examiner—Richard M. Camby
Assistant Examiner—C. Mattix
Attorney, Agent, or Firm—Young & Thompson

[57] ABSTRACT

A one-wheeled vehicle has a spokeless hoop, a rigid load carrier mounted inside the hoop and a seat. The carrier forms a connection between a plurality of guide elements rotatably connected with the carrier and distributed along the circumference of the hoop. The guide elements guide the hoop with respect to the carrier during the rolling movement of the hoop. The vehicle is controlled purely through the rider shifting weight.

5 Claims, 2 Drawing Sheets

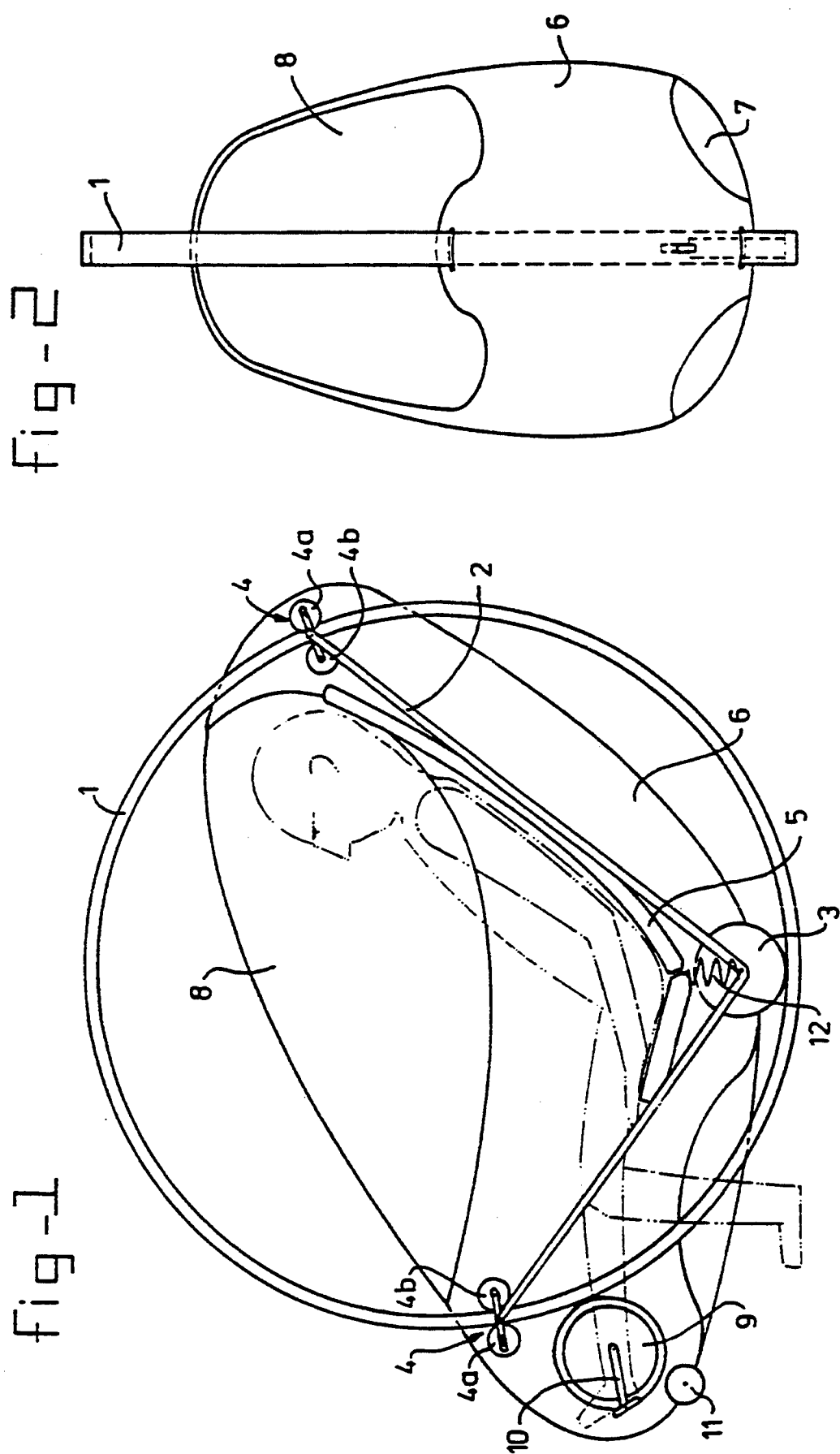

ONE-WHEELED VEHICLE

The invention relates to a one-wheeled vehicle comprising a spokeless hoop, a rigid load carrier mounted inside said hoop and provided with a seat, said carrier forming the connection between a plurality of guide elements rotatably connected with the carrier and distributed along the circumference of the hoop, said guide elements guiding the hoop with respect to the carrier during the rolling movement of the hoop, said vehicle being controllable purely through the rider shifting weight and having no separate steering and no separate supporting or steering wheel to be brought in contact with the ground.

Such a vehicle is disclosed in DE-A-2108492.

The spokeless hoop of this known vehicle is a thick plastic tire which may be provided with an inflatable part to reduce shocks. The tire is provided with sets of rollers, the rollers of each set being axially spaced and secured to the carrier and protuding into recesses in the tire. About the elasticity of the tire no information is given. If the tire would be made of highly elastically deformable material, the rollers would not safely be maintained in the recesses during rolling of the hoop on bumpy roads. The dynamic characteristics of such a vehicle leave much to be desired. Bending movements occur in the hoop to transmit the load to the road.

The object of the invention is to avoid these disadvantages and to this end the one-wheeled vehicle mentioned in the preamble is characterised in that the hoop is made of highly elastically deformable material, in particular spring steel, that the carrier through a wheel at its lower side rests on the inner surface of the hoop, and that each of the guide elements consists of two radially spaced and mutually connected rollers between which the hoop runs.

When the invention is used, no bending moments occur in the hoop to transmit the load to the road. The load-bearing construction, as it were, balances on the wheel. The hoop need only have sufficient rigidity to hold this balancing construction in balance. This balance can be disturbed as a result of load shifts, unevennesses in the road and the like. Using an elastically deformable hoop, for example made of spring steel, will mean that the dynamic characteristics are advantageous. The energy loss on deformation of the hoop through unevennesses in the road is minimised. Through the correct rhythm, the rider can prevent undesirable rolling, energy loss and the like during riding. It is even possible to make the vehicle move forward purely through a periodic weight shift in the forward and backward direction (in the correct rhythm, as in a seesaw movement). The optimum elasticity of the hoop depends on the type of use of the one-wheeled vehicle and the desired comfort. By way of indication, with a hoop diameter of 150 cm and a body weight of 75 kg the bend in the hoop will lie between 2 cm and 10 cm.

The rigid load carrier can comprise a frame which is placed in a cab, or the rigid load carrier can itself be a self-supporting cab. The cab preferably has a fold-away or slide-away roof.

The comfort for the rider is increased by fixing the wheel to the load carrier by means of a shock absorber. For propulsion, the one-wheeled vehicle will generally have a pedal or motor.

By connecting the guide elements rotatably to the load carrier and providing them with rotary rollers between which the hoop runs, the hoop can rotate freely. What is essential for the control of the vehicle is the fact that an external moment can be exerted via the guide elements about an axis in the plane of the hoop, for example by shifting the centre of gravity of the rider outside the plane of the hoop. This type of control is very similar to controlling a bicycle with no hands.

U.S. Pat. No. 2,107,766 discloses a one-wheeled vehicle comprising a spokeless hoop consisting of an inner ring, a ring gear and an outer ring. A carrier is mounted inside the inner ring. Bearing balls are mounted between the inner and outer ring. The combination of inner and outer ring will certainly not be highly deformable.

FR-A-648547 shows a one-wheeled vehicle comprising a pneumatic tire mounted on a hoop which is provided at its inner side with a rail on which rollers of a carrier may roll. There is no talk of a highly elastically deformable hoop.

The invention will now be explained in greater detail with reference to the schematic figures.

FIG. 1 shows a side view of an example of an embodiment of the one-wheeled vehicle according to the invention.

FIG. 2 shows a front view of the one-wheeled vehicle shown in FIG. 1.

Figure 3:
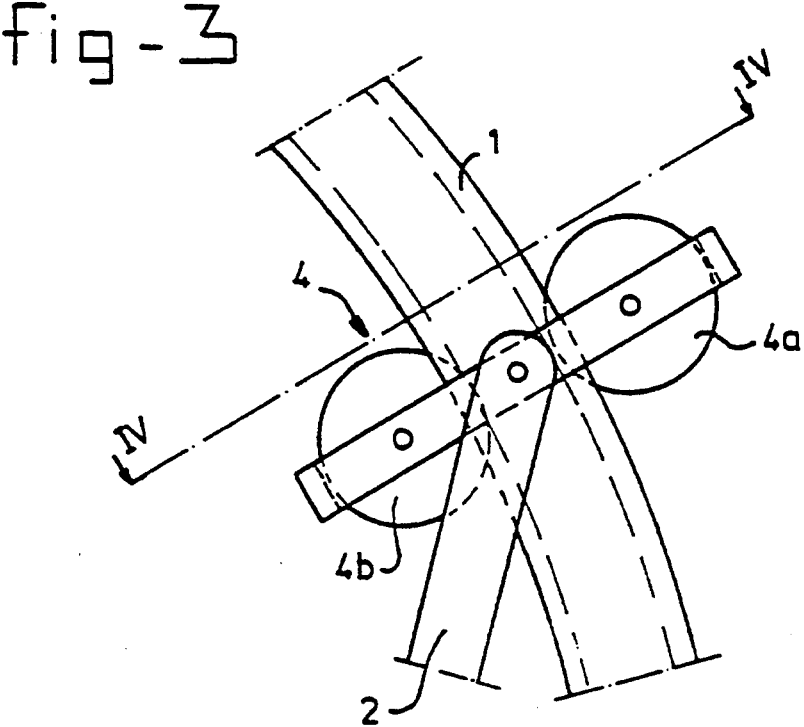
FIG. 3 shows a detail of a guide element of the one-wheeled vehicle according to FIGS. 1 and 2.
Figure 4:
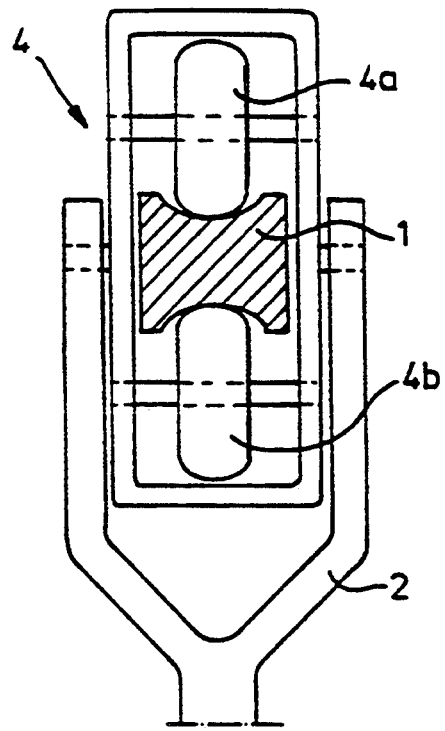
FIG. 4 shows a section along the line IV—IV in FIG. 3.

The one-wheeled vehicle shown comprises a hoop 1, made of highly elastic material such as spring steel, and a rigid load carrier 2, which is connected by its bottom side to a wheel 3 engaging on the inner surface of the hoop and at two points at a distance from each other rotatably connected to two guide elements 4, each provided with two guide rollers 4a, 4b. The hoop runs between these guide rollers and is thereby prevented from bending inwards and outwards at the positions of the guide elements.

It is preferable to fix the wheel 3 to the frame 2 by means of a shock absorber 12 which is generally known in motor vehicles.

A seat 5 for the rider of the vehicle is fitted on the frame 2.

Fitted on the pedal supported relative to the frame is a drive wheel 9 which can be driven by a combination of hub gear, cranks and pedals 10 generally known in the case of bicycles. The drive wheel can engage directly on the outer surface of the hoop, so that the rotation of the drive wheel can be transmitted to the hoop. An auxiliary motor which drives, for example, the wheel 3 can be used instead of the cranks and pedals.

Another wheel 11 can be fitted under the frame at the front side.

Instead of being a rigid frame, the load carrier can also be made as a combination of rigid frame and cab 6 or as an integral construction, a so-called self-supporting cab. The cab has at the bottom side openings 7 for allowing through the legs of the rider and a fold-away roof 8 of transparent material at the top side.

What is essential for the idea of the invention is the provision of a structure propelled by human power or motor power, comprising a highly elastic hoop rotating about a load-bearing structure which, supported on one wheel, together with two or more guide elements which fix the hoop in the longitudinal and transverse direction relative to the frame, forms an integral unit which is stable as such and can be controlled purely by shifting weight.

I claim:

1. In a one-wheeled vehicle comprising a spokeless hoop (1), a rigid load carrier (2) mounted inside said hoop and provided with a seat (5), said carrier forming a connection between a plurality of guide elements (4) distributed along the circumference of the hoop, said guide elements guiding the hoop with respect to the carrier during the rolling movement of the hoop, said vehicle being controllable purely through a rider shifting weight and having no separate steering and no separate supporting or steering wheel to be brought in contact with the ground; the improvement wherein the hoop (1) is made of highly elastically deformable material, the carrier (2) is supported by a wheel (3) at its lower side on the inner surface of the hoop, and each of the guide elements (4) consists of a support pivotally connected with the carrier and supporting two radially spaced and mutually connected rollers (4a, 4b) between which the hoop runs with one roller (4a) outside the hoop and the other roller (4b) inside the hoop.

2. One-wheeled vehicle according to claim 1, wherein the wheel is fixed to the load carrier by means of a shock absorber (12).

3. One-wheeled vehicle according to claim 1, wherein the rigid load carrier comprises a frame (2) which is placed in a cab (6).

4. One-wheeled vehicle according to claim 3, wherein the rigid load carrier is a self-supporting cab.

5. One-wheeled vehicle according to claim 3, wherein the cab has a fold-away or slide-away roof (8).

* * * * *